United States Patent
Kannan et al.

(10) Patent No.: US 10,038,786 B2
(45) Date of Patent: Jul. 31, 2018

(54) METHOD AND APPARATUS FOR IMPROVING GOAL-DIRECTED TEXTUAL CONVERSATIONS BETWEEN AGENTS AND CUSTOMERS

(71) Applicant: 24/7 CUSTOMER, INC., Campbell, CA (US)

(72) Inventors: Pallipuram V. Kannan, Saratoga, CA (US); Ravi Vijayaraghavan, Bangalore (IN); R. Mathangi Sri, Bangalore (IN); Suchana Seth, Bangalore (IN)

(73) Assignee: [24]7.ai, Inc., San Jose, CA (US)

( * ) Notice: Subject to any disclaimer, the term of this patent is extended or adjusted under 35 U.S.C. 154(b) by 548 days.

(21) Appl. No.: 14/638,894

(22) Filed: Mar. 4, 2015

(65) Prior Publication Data
US 2015/0256675 A1 Sep. 10, 2015

(30) Foreign Application Priority Data
Mar. 5, 2014 (IN) .......................... 1131/CHE/2014

(51) Int. Cl.
| | | |
|---|---|---|
| H04M 3/00 | (2006.01) | |
| H04M 3/51 | (2006.01) | |
| H04L 12/18 | (2006.01) | |
| H04L 12/58 | (2006.01) | |
| H04M 3/42 | (2006.01) | |

(52) U.S. Cl.
CPC ...... H04M 3/5183 (2013.01); H04L 12/1827 (2013.01); H04L 51/32 (2013.01); H04L 51/04 (2013.01); H04M 3/42365 (2013.01); H04M 2203/2038 (2013.01); H04M 2203/357 (2013.01)

(58) Field of Classification Search
CPC ........... H04M 3/5183; H04M 3/42365; H04M 2203/2038; H04M 2203/357; H04L 12/1827; H04L 51/32; H04L 51/04; G06F 3/14; G06Q 30/00; G06Q 30/02
USPC ................. 379/265.09; 715/752; 705/14.51; 709/204
See application file for complete search history.

(56) References Cited

U.S. PATENT DOCUMENTS

| | | |
|---|---|---|
| 7,809,714 B1 | 10/2010 | Smith |
| 2001/0054064 A1 | 12/2001 | Kannan |
| 2007/0130257 A1 | 6/2007 | Bedi et al. |
| 2009/0063992 A1 | 3/2009 | Gandhi et al. |
| 2010/0091960 A1 | 4/2010 | Ervin et al. |
| 2010/0332287 A1 | 12/2010 | Gates et al. |

(Continued)

OTHER PUBLICATIONS

PCT International Search Report dated Jun. 9, 2015, for PCT/US2015/018960, 12 pages.

*Primary Examiner* — Ahmad F Matar
*Assistant Examiner* — Jirapon Intavong
(74) *Attorney, Agent, or Firm* — Perkins Coie LLP

(57) ABSTRACT

In accordance with an example embodiment a computer-implemented method and an apparatus for predicting and tracking of mood changes in textual conversations are provided. The method includes determining, by a processor, one or more mood metrics in each of two or more chat stages of a real-time textual conversation between an agent and a customer. Changes in the one or more mood metrics across the two or more chat stages of the real-time textual conversation are tracked by the processor. Further, the method includes determining, by the processor, at least one action associated with the real-time textual conversation based on the changes in the one or more mood metrics.

40 Claims, 6 Drawing Sheets

(56) References Cited

U.S. PATENT DOCUMENTS

2013/0110565 A1 5/2013 Means, Jr. et al.
2013/0129076 A1 5/2013 Kannan et al.
2013/0185215 A1 7/2013 Patrick et al.
2013/0325437 A1 12/2013 Lehman et al.
2013/0346885 A1 12/2013 Singh et al.

FIG. 3

METHOD AND APPARATUS FOR IMPROVING GOAL-DIRECTED TEXTUAL CONVERSATIONS BETWEEN AGENTS AND CUSTOMERS

CROSS REFERENCE TO RELATED APPLICATIONS

This application claims the benefit of Indian Provisional Patent Application No. 1131/CHE/2014, filed in the Indian Patent Office on Mar. 5, 2014, which is incorporated herein in its entirety by this reference thereto.

TECHNICAL FIELD

The present invention generally relates to mining of textual conversations and more particularly to improving goal-directed textual conversations between agents and customers based on predicting and tracking of mood changes in the textual conversations.

BACKGROUND

In various organizations, companies, product and service centres and communities, agents (for example, customer services representatives) engage with customers in goal-directed dialogues for addressing concerns of the customers. Oftentimes, the agents carry out the goal-oriented dialogues in form of textual conversations, such as online chat conversations with the customers. For effectively achieving a target outcome of a textual conversation, various models have been developed to analyze mood of a customer during the textual conversation with an agent to get insights about the customer's intent and the likelihood of the conversation reaching the target outcome. However, conventional mood (or sentiment) mining techniques are only concerned with predicting an overall sentiment expressed in a body of text corresponding to the textual conversation. As a result, the conventional mood mining techniques are rendered inadequate for the purpose of deriving insights for achieving the target outcome in the goal-directed textual conversations.

SUMMARY

This summary is provided to introduce a selection of concepts in a simplified form that are further described below in the detailed description. This summary is not intended to identify key or essential features of the claimed subject matter, nor is it intended to be used as an aid in determining the scope of the claimed subject matter.

Various apparatuses, methods, and computer readable mediums for improving goal-directed textual conversations between agents and customers based on predicting and tracking of mood changes in textual conversations are disclosed. In an embodiment, a computer-implemented method includes determining, by a processor, one or more mood metrics in each of two or more chat stages of a real-time textual conversation between an agent and a customer. The computer-implemented method also includes tracking, by the processor, changes in the one or more mood metrics across the two or more chat stages of the real-time textual conversation. Further, the computer-implemented method includes determining, by the processor, at least one action associated with the real-time textual conversation based on the changes in the one or more mood metrics.

In another embodiment of the invention, an apparatus for improving goal-directed textual conversations between agents and customers based on predicting and tracking of mood changes in textual conversations is disclosed. The apparatus comprises at least one processor and a storage module. The storage module is adapted to store machine executable instructions therein, that when executed by the at least one processor, cause the apparatus to determine one or more mood metrics in each of two or more chat stages of a real-time textual conversation between an agent and a customer. The apparatus is further configured to track changes in the one or more mood metrics across the two or more chat stages of the real-time textual conversation. Further, the apparatus is configured to determine at least one action associated with the real-time textual conversation based on the changes in the one or more mood metrics.

In another embodiment of the invention, a non-transitory computer-readable medium storing a set of instructions that when executed cause a computer to perform a method for improving goal-directed textual conversations between agents and customers based on predicting and tracking of mood changes in textual conversations is disclosed. In an embodiment, the method includes determining, by a processor, one or more mood metrics in each of two or more chat stages of a real-time textual conversation between an agent and a customer. The method also includes tracking, by the processor, changes in the one or more mood metrics across the two or more chat stages of the real-time textual conversation. Further, the method includes determining, by the processor, at least one action associated with the real-time textual conversation based on the changes in the one or more mood metrics.

In another embodiment of the invention, an apparatus for improving goal-directed textual conversations between agents and customers based on predicting and tracking of mood changes in textual conversations is disclosed. An apparatus comprises at least one processor, and a storage module having stored therein machine executable instructions, that when executed by the at least one processor, cause the apparatus to supervise one or more real-time textual conversations between one or more agents and one or more customers. The apparatus is configured to, for supervising a real-time textual conversation of the one or more real-time textual conversations, determine one or more mood metrics in each of two or more chat stages of the real-time textual conversation between an agent and a customer associated with the real-time textual conversation. The apparatus is further configured to track changes in the one or more mood metrics across the two or more chat stages of the real-time textual conversation, and determine at least one action associated with the real-time textual conversation based on the changes in the one or more mood metrics.

BRIEF DESCRIPTION OF THE FIGURES

FIG. 3 illustrates a first example user interface corresponding to a supervisor chat console in accordance with an embodiment of the invention;

Figure 1:
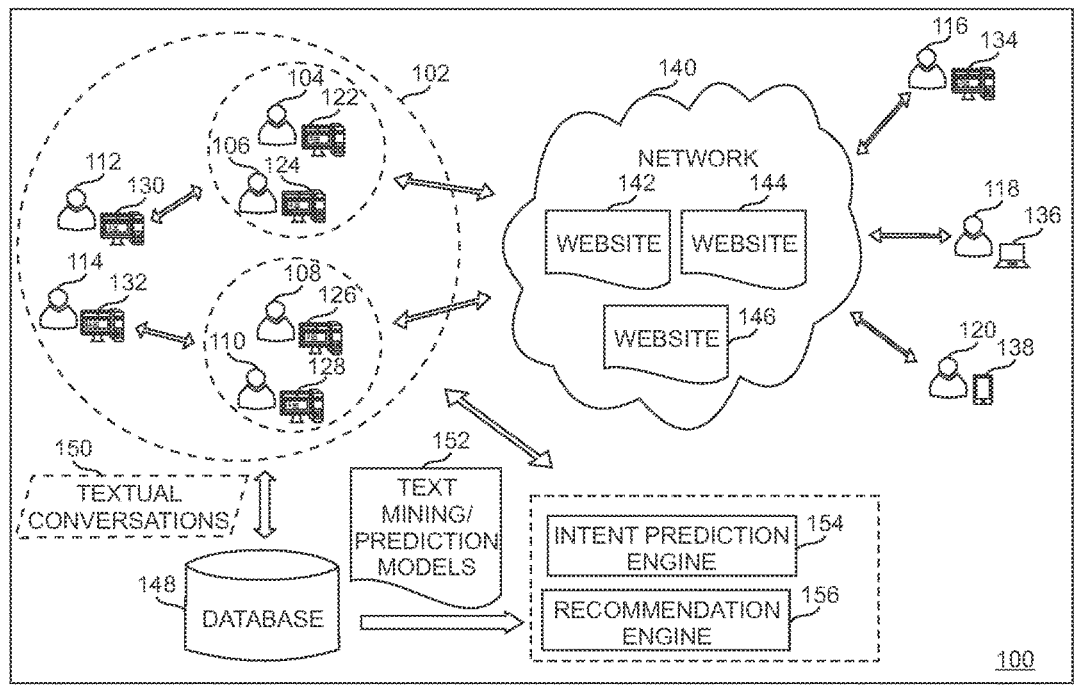
FIG. 1 illustrates an example environment in which various embodiments of the present invention may be practiced.

The drawings referred to in this description are not to be understood as being drawn to scale except if specifically noted, and such drawings are only exemplary in nature.

DETAILED DESCRIPTION

The terms "a" and "an" herein do not denote a limitation of quantity, but rather denote the presence of at least one of the referenced item. The term 'textual conversation' as used hereinafter refers to a real-time textual conversation, such as an interactive online chat conversation between a customer and a customer service representative (hereinafter also used interchangeably as 'agent'). Examples of the textual conversation may also include a chat conversation where all or some of the agent's inputs in the chat conversation may be provided by automated or semi-automated means. Some additional examples of the textual conversation also include a real-time voice based conversation (hereinafter referred to as the 'voice based conversation') where the voice based conversation is converted into the textual conversation by automated or semi-automated means, for example, computer programs.

Further, the terms 'mood' or 'customer mood' as used hereinafter refer not only to positive, neutral and negative customer mood, but also to metrics related to customer mood, for example, customer effort, customer engagement and customer satisfaction. It is noted that any appropriate combination of these metrics and the variables that drive them may be utilized herein for mood tracking/prediction purposes. It is further noted that the text mining algorithms that are used to identify the nature and degree of such moods may also be suitably modified to best capture the peculiarities of the metrics mentioned above. For example, if changes in customer engagement are to be measured and tracked, then a customer engagement score may be defined, which may be configured as a suitably weighted combination of customer mood, customer response time, frequency of use of emoticons, frequency of use of other interactive elements or widgets available in the interaction environment, and so on and so forth.

It is further noted that metrics analogous to mood related to a customer service representative or an agent—such as an agent effort score (or agent engagement score) which is a suitably weighted combination of agent response time, agent textual conversation concurrency (number of textual conversations handled simultaneously by agent), agent mood, degree of agent adherence to recommended response templates, etc., may also be defined, measured and tracked. For each line or stage of a textual conversation, any combination of the above mood-like metrics for customer and/or agent may be predicted and used. Further, the term "mood drop" as used hereinafter refers not only to an actual fall in mood from positive mood towards negative mood (or from positive mood to neutral mood, or, from neutral mood to negative mood), but also stands for any anomalous mood pattern that may be learnt for future tracking/prediction purposes. Furthermore, the term "mood drop" may also stand for any mood patterns that are useful indicators of ideal interactions or optimal customer engagement scenarios.

FIG. 1 illustrates an example environment 100 in accordance with various embodiments of the invention. The environment 100 depicts a simplified visual representation of a customer sales and service center 102 including a plurality of customer service representatives (referred to as 'agents' hereinafter), such as an agent 104, an agent 106, an agent 108 and an agent 110 (hereinafter collectively referred as agents 104-110). The customer sales and service center 102 further includes a plurality of supervisors, such as a supervisor 112 and a supervisor 114 (hereinafter collectively referred as supervisors 112-114). Each supervisor from among the plurality of supervisors is entrusted, at least in part, with the role of supervising real-time textual conversations (hereinafter referred to as textual conversations) between agents and customers. For example, the supervisor 112 is depicted to be entrusted with the supervision of textual conversations involving the agents 104 and 106, and, the supervisor 114 is depicted to be entrusted with the supervision of textual conversations involving the agents 108 and 110.

It is understood the customer sales and service center 102 is depicted to include four agents (for example, the agents 104-110) and two supervisors (for example, the supervisors 112-114) for illustration purposes and that the customer service center 102 may include a plurality of such agents and supervisors. Moreover, a number of agents supervised by a supervisor may also vary from the number depicted in the environment 100. Further, the supervisors 112-114 may supervise the textual conversations involving the agents 104-110 on a real-time basis or in an offline manner or as a combination of real-time and offline approaches.

Each agent from among the plurality of agents is associated with an electronic device for engaging in textual conversations with customers disposed at diverse geographical locations, such as customers 116, 118 and 120 (hereinafter collectively referred as customers 116-120). For example, the agent 104 is associated with electronic device 122; the agent 106 is associated with an electronic device 124, the agent 108 is associated with an electronic device 126 and the agent 110 is associated with an electronic device 128. The supervisors 112-114 are similarly associated with electronic devices for supervising the conversations involving the agents 104-110. For example, the supervisor 112 is associated with an electronic device 130 and the supervisor 114 is associated with an electronic device 132. The electronic devices 122, 124, 126, 128, 130 and 132 (hereinafter collectively referred as electronic devices 122-132) are depicted as desktop computers for illustration purposes, and it is understood that the electronic devices 122-132 may be any electronic device configured to facilitate a textual conversation between two remote entities (for example, an agent and an existing/potential customer or even a supervisor and an agent). For example, one or more electronic devices from among the electronic devices 122-132 may be a telephone instrument configured to facilitate a voice based conversation between an agent and a customer. The customers 116, 118 and 120 may similarly be associated with electronic devices for engaging in textual conversations with the agents 104-110.

The customer 116 is depicted to be associated with a desktop computer 134, the customer 118 is depicted to be associated with a laptop 136 and the customer 120 is depicted to be associated with a tablet personal computer 138. It is noted that the electronic devices, such as the desktop computer 134, the laptop 136 and the tablet personal computer 138 (hereinafter collectively referred as electronic devices 134-138) are depicted for illustration purposes. Further, the textual conversations conducted using the electronic devices 134-138 are depicted as single-channel based textual conversations for illustration purposes only. It is noted that one or more customers from among the customers 116-120 may be associated with multiple electronic devices and may conduct textual conversations with agents over multiple devices and/or using multiple channels (such as a web channel, a speech channel, a native channel, an IVR channel and the like). Further, a multiple device/channel textual conversation between a customer and an agent may be performed concurrently or separately as per the customer's need.

The textual conversations between the agents 104-110 and the customers 116-120 may be performed over a network 140. Examples of the network 140 may include wired networks, wireless networks or a combination thereof. Examples of wired networks may include Ethernet, local area network (LAN), fiber-optic cable network and the like. Examples of wireless network may include cellular networks like GSM/3G/CDMA networks, wireless LAN, Bluetooth or Zigbee networks and the like. An example of a combination of wired and wireless networks may include the Internet. In an example scenario, the network 140 may provision access to one or more websites included therein, such as a website 142, a website 144 and a website 146 (hereinafter collectively referred as websites 142-146).

The websites 142-146 may be accessed by existing/potential customers such as the customers 116-120. During the course of browsing through a website, such as an e-commerce based website, a customer (for example, an customer from among the customers 116-120) may wish to engage in a textual conversation with a customer service representative (for example, an agent from among the agents 104-110) to inquire about a product or a service prior to making a purchase of the product or the service. In some example scenarios, the customer may also wish to engage in textual conversation after purchasing a product or a service (for example, to configure or troubleshoot the product, to enquire about upgrades, to enquire about billing or payment or shipping of the product/service, to provide feedback, to register a complaint, to follow up about a previous query and the like). Accordingly, a customer, such as a customer from among the customers 116-120, may initiate a textual conversation in the form of a chat conversation with an agent from among the agents 104-110. It is noted that though the textual conversations (for example, online chat conversations or voice calls) mentioned herein refer to textual conversations initiated by customers to the agents; however the textual conversations may also be initiated by the agents to contact the customers. For example, agents such as the agents 104-110 may initiate the textual conversations for soliciting a purchase of a product/service, for responding to an earlier customer query or for requesting feedback related to a product/service offered on a website from among the websites 142-146.

In some example scenarios, textual content corresponding to the textual conversations between the customers 116-120 and the agents 104-110 are stored in a database 148 as textual conversations 150. Further, the database 148 is configured to store interaction data such as, which agent handled a textual conversation, outcome of the textual conversation, textual conversation transfers if any and the like. Additionally, the database 148 may also be configured to store information corresponding to the customer, such as customer profile information and information related to the customer's surfing activity on the website, such as pages visited, events on a page, options selected/clicked on the page, rules fired on the page and the like. The information stored in the database 148 may be subjected to a set of text mining and prediction models 152 for mining relevant information that drive an intent prediction engine 154 and a recommendation engine 156. The mined information enables (1) the intent prediction engine 154 to infer (or predict) intents of the customers 116-120 for contacting the agents 104-110, and (2) the recommendation engine 156 to propose recommendations based on the customer profile information and the inferred (or predicted) intent. Examples of the text-mining and prediction models 152 may include, but are not limited to models based on Logistic regression, Naïve Bayesian, Rule Engines, Neural Networks, Decision Trees, Support Vector Machines, k-nearest neighbour, K-means and the like.

The text-mining and prediction models 152 may be configured to extract certain features from the textual conversations between a customer and an agent. Further, the text-mining and prediction models 152 may be configured to extract features by utilizing a relationship between the customer and the agent interactions (for example, sentiment of the customer for a given agent response). Examples of the features that may be fed into the text-mining and prediction models 152 may include, but are not limited to, any combinations of words features such as n-grams, unigrams, bigrams and trigrams, word phrases, part-of-speech of words, sentiment of words, sentiment of sentences, position of words, customer keyword searches, customer click data, customer web journeys, the customer interaction history and the like. In an embodiment, the text mining and prediction models 152 may utilize any combination of the above-mentioned input features along with the customer interaction data such as, but not limited to, which agent handled the textual conversation, what the outcome was, textual conversation transfers if any and the like to predict the customer's likely intents.

In a textual conversation, such as an online chat conversation between an agent and a customer, changes in a customer's mood as the conversation progresses contain important insights about the customer's intent and the likelihood of the textual conversation reaching a target outcome. Such insights can be used in real-time to fulfil the customer's intent more effectively and drive the textual conversation towards the target outcome. Various embodiments of the present invention provide systems and methods for predicting and tracking of mood changes in textual conversations and utilizing the prediction/tracking in driving the textual conversations to target outcomes. A system for predicting and tracking of mood changes in textual conversations and improving goal-oriented textual conversations is explained with reference to FIG. 2.

Figure 2:
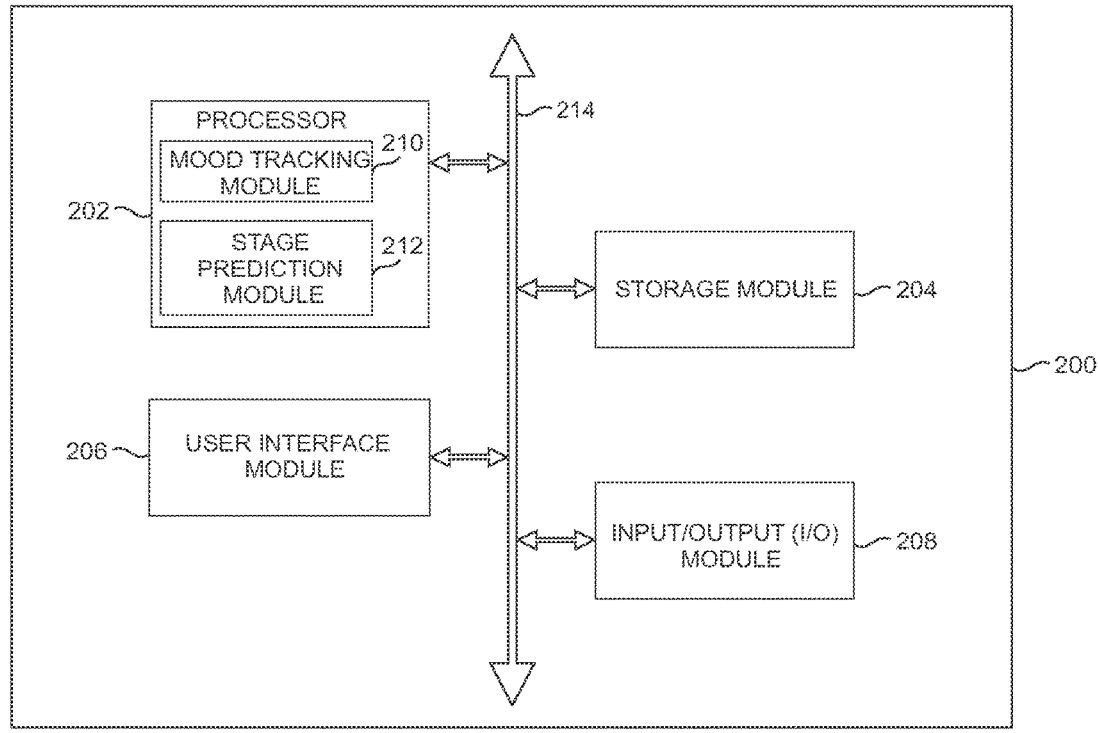
FIG. 2 illustrates a block diagram of an apparatus configured to improve goal-directed textual conversations between agents and customers based on predicting and tracking of mood changes in textual conversations in accordance with an embodiment of the invention.

FIG. 2 illustrates a block diagram of an apparatus 200 configured to improve goal-directed textual conversations between agents and customers based on predicting and tracking of mood changes in textual conversations, in accordance with an embodiment of the invention. In an embodiment, the apparatus 200 is configured to be in communication with the electronic devices 122-132 associated with the agents 104-110 and the supervisors 112-114 (depicted in FIG. 1). More specifically, each of the electronic devices 122-132 and the apparatus 200 include requisite hardware, software and/or firmware (not shown in FIG. 2) for interacting with each other. For example, the electronic devices 122-132 may access the apparatus 200 using wired means, wireless means or a combination thereof. The apparatus 200 is configured to facilitate predicting and tracking of mood changes in textual conversations being conducted between the electronic devices 122-128 associated with the agents 104-110 and the electronic devices 134-138 associated with the customers 116-120. For example, in embodiments including a textual conversation in form of an online chat conversation between an agent and a customer, changes in customer/agent mood metrics over the course of the textual conversation may be predicted and tracked to capture progress towards the goal of the chat conversation as the chat conversation progresses in real-time.

The prediction and tracking of mood changes is explained hereinafter with reference to the textual conversations in form of interactive textual conversations (also referred to herein as 'chats') between customers and agents. However, the embodiments described hereinafter may not be limited to interactive chats and that speech-to-text transcripts of voice based conversations may also be subjected to prediction and tracking of mood changes using the apparatus 200. It is understood that appropriate adjustments may be configured for predicting and tracking of mood changes in voice based conversations by the apparatus 200. For example, a real-time voice based conversation between the agent and the customer may be accessed and converted to a real-time textual conversation.

The apparatus 200 is depicted to include a processor 202, a storage module 204, a user interface module 206 and an input/output (I/O) module 208. The processor 202 is further depicted to include a mood tracking module 210 and a stage prediction module 212. The various components of the apparatus 200, such as the processor 202, the storage module 204, the user interface (UI) module 206, the I/O module 208 and the components embodied in the processor 202, for example the mood tracking module 210 and the stage prediction module 212 are communicatively associated with each other via a bus 214. Examples of the bus 214 may include a data bus, a control bus, an address bus, a serial bus, a bi-directional bus and the like. It is noted that the apparatus 200 may include fewer or more components than that depicted in FIG. 2. As such, some components of the apparatus 200 can be optional, and/or the functionalities of one or more components of the apparatus 200 can be embodied in other components of the apparatus 200.

In an embodiment, the processor 202 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the mood tracking module 210 of the processor 202 is configured to determine one or more mood metrics and track changes in the mood metrics in on-going textual conversations between agents and customers. In an example, the one or more mood metrics includes a customer engagement score determined based on at least one of a customer sentiment parameter, a customer response time, and a frequency of use of emoticons in the textual conversation. Additionally or optionally, the one or more mood metrics may also include an agent engagement score for quantifying a quality of engagement of the agent in the textual conversation. The agent engagement score may be determined based on at least one parameter including but not limited to, an agent response time, agent chat concurrency (for example, a number of chats concurrently handled by an agent), and a parameter associated with agent's adherence to a recommended response template. In an example, the one or more mood metrics may include mood metrics other than the customer engagement score and the agent engagement score, for example customer satisfaction, customer effort, and the like.

In an embodiment, the storage module 204 may be configured to store algorithms that are used by the mood tracking module 210 to determine one or more mood metrics in each of two or more chat stages of a real-time textual conversation between an agent and a customer, to track changes in the one or more mood metrics across the two or more chat stages of the real-time textual conversation, and to determine at least one action associated with the real-time textual conversation based on the changes in the one or more mood metrics. Additionally, in an embodiment, the at least one action may also be determined based on historical information associated with one or more completed textual conversations or based on a statistical analysis of the one or more completed textual conversations along with the tracked changes in the one or more mood metrics. There may be various examples of the at least one action that may be determined to be performed, based on the tracked changes in the one or more mood metrics. For instance, in an embodiment, the at least one action may relate to actions helping in driving the textual conversation to a target outcome. For instance, in an example, the at least one action includes providing information related to recommendations for the agent by the supervisor so that the supervisor can intervene in the real-time textual conversation via message to the agent, and provide the agent with the recommendations. Additionally or alternatively, the at least one action may include the supervisor taking over the control of the ongoing textual conversation from the agent in case if there is any indication that the textual conversation with the customer is not going to result in the target outcome. Additionally or alternatively, the at least one action may include only monitoring and storing the textual conversation between the agent and the customer for quality improvement purposes, or for performance review of the agent by the supervisor.

Various embodiments of the present invention provision algorithms used by the mood tracking module 210 to determine the one or more mood metrics in various chat stages of the textual conversation. An example of the algorithm for determining mood metrics is an algorithm based on lexicon-based sentiment analysis'. In the lexicon-based sentiment analysis, mood metrics are determined for one or more sections in a given chat stage based on semantic orientation of features (for example, words or phrases) in the one or more sections of the given chat stage. Herein, a section of any chat stage may refer to one or more textual lines or sentences within the chat stage, and for which at least one mood metric may be calculated. In an example implementation of the lexicon-based sentiment analysis, polarity label for each word in the section is determined, for example, a positive polarity, a negative polarity or a neutral polarity. Further, based on the counting of different polarity labels, mood metrics in the given chat stage (for example, an overall mood of the chat stage) are computed. For example, in the given chat stage, a number of words with positive polarity and a number of words with negative polarity are calculated, and the overall mood of the chat stage is calculated based on the counting of words with positive polarity and negative polarity in the given chat stage. In another implementation, polarity strength score is also determined for a polarity label that is assigned to a word. For example, the polarity strength score represents a degree to which the word is of positive polarity or negative polarity. In this implementation, a weighted polarity score may be calculated for each word based on the polarity label and strength of the polarity label. Further, based on the aggregation of the polarity labels and the polarity strength scores, weighted polarity scores for each word in the given chat stage is calculated to determine an overall mood of the given chat stage.

Additionally or alternatively, an algorithm based on 'subjectivity-based approach' can also be used to determine mood metrics for chat stages of the real-time textual conversation. In an implementation of an algorithm based on subjectivity-based approach, terms annotated or classified as objective are first removed from the sections of the chat stages, before determining polarity (for example, positive, negative or neutral polarity) of the textual content of the sections of the chat stages. For instance, in an example of the algorithm based on the subjectivity-based approach, the primary focus is to determine subjective textual content (for example, words and texts) that may mark the presence of opinions, allegations, desires, beliefs, suspicions, speculations or evaluations in the sections of the chat stages. It should be noted that adjectives in a sentence may be considered as highest suitable predictors of subjectivity, and some other part-of-speech in the sentence considered for subjectivity include pronouns and adverbs, and also cardinal numbers. Accordingly, in an implementation of the subjective-based approach for determining overall mood, a subjectivity classification is performed on sentences/clauses of the sections of the chat stages, for example, textual content within the sentences/clauses are first classified as subjective or objective. Once, the subjectivity classification is performed, for the sentences/clauses classified as subjective, it is further determined whether the sentences or clauses are of positive opinion or of negative opinion to determine corresponding mood metrics and the overall mood based on the mood metrics.

Additionally or alternatively, an algorithm based on 'supervised text classification approach' may also be used for sentiment analysis and determination of mood metrics across various chat stages of the real-time textual conversation. In the supervised text classification approach, sections of the chat stages are manually examined to determine class labels for example, a positive label or a negative label, for features (for example, words, phrases and/or sentences) in the sections. Further, classifiers are built based on the positive/negative labels annotated to the features. Some examples of the classifiers are classifiers based on algorithms including, but not limited to, Naive Bayes, logical regression, support vector machines, decision trees, random forest, ensemble models and the like.

The above described algorithms/approaches for the sentiment analysis and determination of overall mood across the chat stages of the textual conversation may also be used in conjunction with one or more additional or supplementary algorithms/approaches, with flexibility for fusion of multiple model topologies and multiple voting schemes. Examples of such additional algorithms may include, but are not limited to, entity recognition algorithms, similarity scoring algorithms and various classifiers, and models described with reference to the text mining and predictive models 152 used by the intent prediction engine 154 as described with reference to FIG. 1.

In an embodiment, the storage module 204 is configured to include the database 148 depicted in FIG. 1 along with the corresponding information. In some embodiments, the storage module 204 may be configured by using one or more volatile memories, one or more non-volatile memories or a combination of volatile and non-volatile memories. Examples of a volatile memory may include, but are not limited to, random access memory, dynamic random access memory, static random access memory, and the like. Examples of a non-volatile memory may include, but are not limited to hard disk, magnetic tape, optical disk, programmable read only memory, erasable programmable read only memory, electrically erasable programmable read only memory, flash memory, and the like. In an embodiment, various algorithms/approaches and corresponding set of instructions may be stored in the storage module 204. Further, the textual conversation may be stored in the storage module 204 along with a timestamp of transcripts of the textual conversation.

In an embodiment, the UI module 206 of the apparatus 200 is configured to support interactive chats on websites such as the websites 142-146 explained in FIG. 1. More specifically, the UI module 206 is configured, at least in part, to populate chat consoles with options, which facilitate in progressing a textual conversation towards a target outcome. In an embodiment, the UI module 206 of the apparatus 200 is configured to display information associated with the at least one action to a supervisor monitoring the real-time textual conversation. A chat console as used herein refers to a window that pops up within an Internet browser application UI corresponding to a particular webpage to facilitate an interactive textual conversation between an agent and a customer. In some embodiments, the chat console is also provisioned to a supervisor (such as a supervisor from among the supervisors 112-114) for supervising the textual conversations between one or more agents and customers, and for providing information or feedback to the agents on the on-going textual conversations in real-time. Example UIs corresponding to the chat console for the supervisor are explained later with reference to FIGS. 3 and 4.

In an embodiment, the components of the processor 202, for example the mood tracking module 210, the stage prediction module 212 and other components (not shown) are configured to predict chat stages, determined mood metrics in various chat states and track changes in the mood metrics across the various chat stages. In general, as described with reference to FIG. 1, the prediction of the customer intents and the identification of the recommendations for the agents are performed by an intent prediction engine (such as the intent prediction engine 154 of FIG. 1) and a recommendation engine (such as the recommendation engine 156 of FIG. 1), respectively. It should be noted that the functionalities of the intent prediction engine 154 and the recommendation engine 156 are embodied in the mood tracking module 210 and other components (not shown) of the processor 202.

In an embodiment, the stage prediction module 212 is configured to predict the two or more chat stages from among a plurality of chat stages associated with the real-time textual conversation for determining the one or more mood metrics in each of the two or more chat stages. The term "stage" of a textual conversation as used herein refers to a contiguous set of responses by customer and/or agent that form a functional sub-unit of the textual conversation and/or form a logical sub-context within the textual conversation. For example, textual conversations may begin with a "greetings" stage in which the agent greets the customer and/or the customer responds with a greeting. Similarly, in a textual conversation where the customer is trying to locate and order the correct replacement part for an appliance from an online retailer, relevant stages of the textual conversation might be "ask model number", "provide model number", "confirm model number", "order confirmation", "shipping query", etc. In an embodiment, the stage prediction module 212 is also configured to define the plurality of chat stages based on at least one of contiguous set of responses between the agent and the customer in the real-time textual conversation, functional sub-units of the contiguous set of responses between the agent and the customer in the real-time textual conversation, and a plurality of logical sub-contexts in the real-time textual conversation.

It is understood that not every textual conversation will necessarily include all the chat stages defined for textual conversations occurring on that website. The presence or absence of certain chat stages, and their sequence may in fact serve as signals for progress of the textual conversation towards a target outcome. In some embodiments, such chat stages are used to predict customer intent, and/or recommend the next best action to an agent, preferably in combination with other variables. The text mining and machine learning algorithms that can be used to predict chat stages of the textual conversation include, but are not limited to, classification algorithms based on Naïve Bayes or Logistic Regression, clustering algorithms like k-means or hierarchical clustering, decision trees, random forests, hidden Markov models, conditional random fields, and other algorithms based on probabilistic graphical models used for sequence mining and prediction, with flexibility for fusion of multiple model topologies and multiple voting schemes.

Further, the mood tracking module 210 determines the changes in the one or more mood metrics across the two or more chat stages and determines, along with other components, at least one action to be performed associated with the textual conversation. The apparatus 200 is caused to perform the at least one action associated with the textual conversation, for example by enabling the I/O module 208. In an embodiment, the I/O module 208 is configured to display one or more textual recommendations from the supervisor to the agent so as to enable the agent to use the one or more textual recommendations in the textual conversation to thereby cause a target outcome of the textual conversation. In an embodiment, the I/O module 208 is configured to provide the information associated with the at least one action to the agent engaged in the textual conversation based on an input received from the supervisor. As the information associated with the at least one action (for example recommendations) is accessed by the agent, it enables the agent to perform the at least one action thereby causing the textual conversation to conclude with the target outcome.

In another embodiment, the apparatus 200 may also be embodied in the electronic devices (for example, the electronic devices 122-128) associated with the agents (for example, the agents 104-110), and this embodiment of the present invention can operate even without the presence of the supervisor (for example, the supervisors 112 and 114) in a setup, for example the environment 100. In this embodiment, the components of the apparatus 200 are configured to predict and track mood changes in the textual conversation between the agents and the customers and provide recommendations to the agents to drive the textual conversation to the target outcome. Moreover, the apparatus 200 can handle one or more textual conversations simultaneously between an agent and one or more customers.

In an embodiment, the various components of the apparatus 200 such as the processor 202 and its components, such as the mood tracking module 210 and the stage prediction module 212, the storage module 204, the UI module 206, the I/O module 208, and the bus 214 may be implemented using hardware, software, firmware or any combination thereof. As suggested above, the UI module 206 is configured to provision a chat console to a supervisor for supervising the textual conversations between one or more agents and customers, and for providing feedback as information to the agents engaged in the textual conversations in real-time. As such, the UI module 206 is configured to display a visual representation of the one or more mood metrics determined in each of the two or more chat stages for tracking the changes in the one or mood metrics. The system assisted prediction and tracking of mood changes in textual conversations is further illustrated with reference to an example UI corresponding to the supervisor chat console in FIG. 3.

Figure 3:
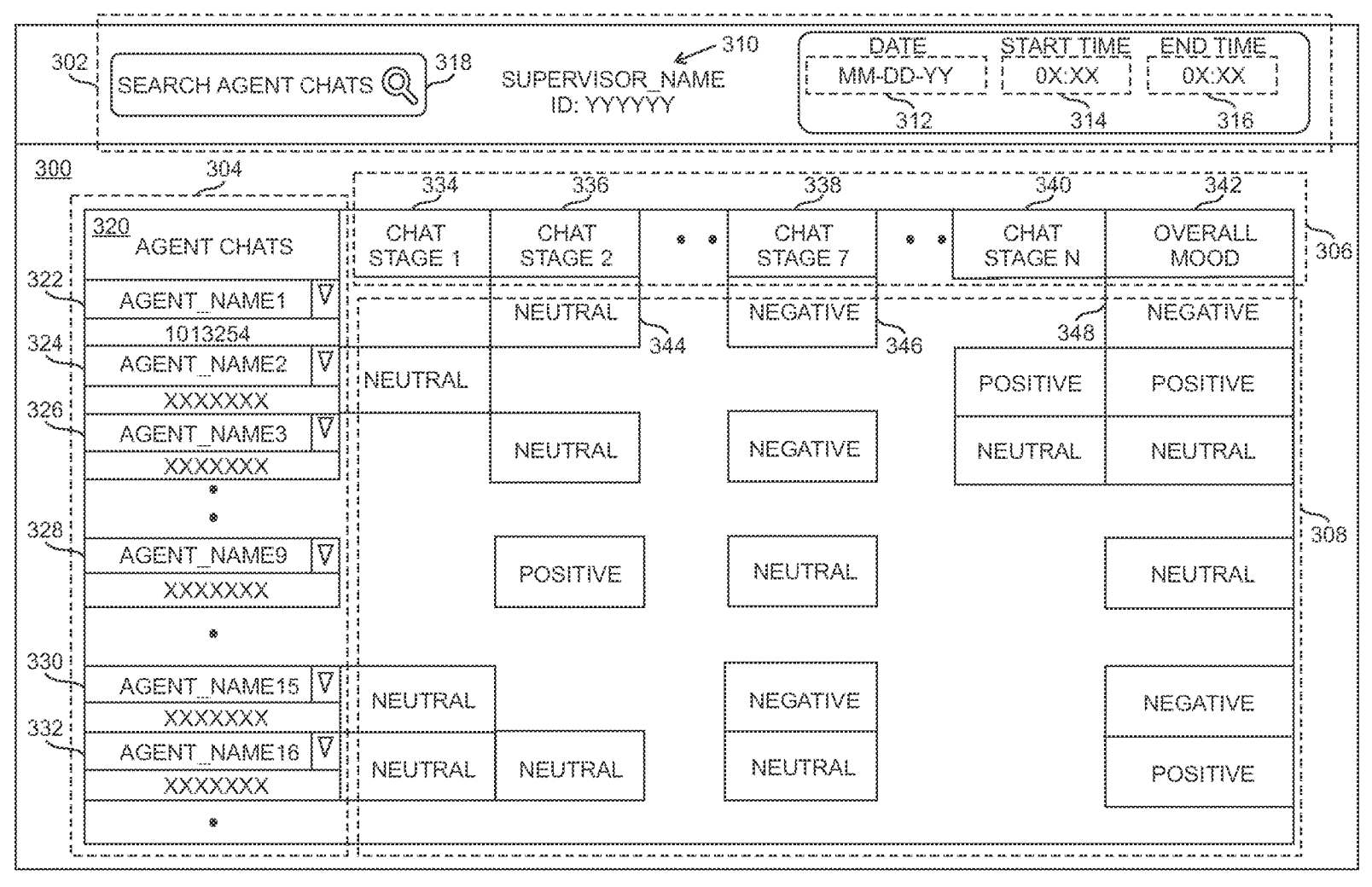

Referring now to FIG. 3, a first example UI 300 corresponding to a supervisor chat console is illustrated in accordance with an embodiment of the invention. The first example UI 300 (hereinafter referred to as UI 300) presents the supervisor with a view in which he/she can see a visual representation of overall moods (determined based on one or more mood metrics) in various chat stages of each textual conversation in progress during the current time interval for all agents for supervising the agents. In some embodiments, the UI 300 is also referred to as a 'Snapshot view'. The UI 300 is depicted to include a UI information panel 302, an agent chats column 304, a chat stage row 306 and a mood display section 308. The UI information panel 302 is depicted to include a supervisor information display portion 310 displaying a supervisor name and an identification (ID) number assigned to the supervisor, for example by the customer sales and service center 102 of FIG. 1.

The UI information panel 302 further displays a current date 312, as well as a start time 314 and an end time 316 of the current time interval for which the information displayed in the mood display section 308 is valid. In some embodiments, the time interval i.e. the start time 314 and the end time 316 of the time interval may be configured to be adjustable by the supervisor as per his/her requirements. The UI information panel 302 further includes search functionality in form of a search dialog box 318 to allow easy retrieval of data for specific agents or textual conversations based on agent names, chat IDs or chat keywords. Additionally, the UI information panel 302 may include a filter functionality (not shown in FIG. 3) to enable the supervisor to filter chats by current chat stage, by mood, by agent, by time spent in current chat stage and/or by any such other relevant combinations.

The agent chats column 304 displays a list of all agents currently chatting in the selected time interval. More specifically, the agent chats column 304 depicts a column heading 'Agent Chats' 320 followed by a listing of agent names in subsequent column cells as exemplarily depicted in column cells 322, 324, 326, 328, 330 and 332. For example, the column cell 322 displays an agent name as 'Agent_Name1'. Each such column cell is associated with a drop-down option, upon selection of which a chat ID associated with the agent name is displayed to the supervisor. For example, upon selection of the drop-down option associated with Agent_Name1 in the column cell 322, a chat ID exemplarily depicted to be 1013254 is displayed to the supervisor. In an embodiment, in a default mode, all the column cells associated with agent names are depicted to display a chat ID associated with a corresponding agent name (as depicted in FIG. 3). However, in scenarios involving a large number of textual conversations, the chat IDs corresponding to the agent names are hidden from view of the supervisor and may be accessed by selecting the drop-down options. In an embodiment, the supervisor may access a drill-down view of the corresponding textual conversation by selecting (or clicking on) the chat ID displayed in the agent chats column 304. The drill down view is explained later with reference to FIG. 4.

The chat stage row 306 displays a list of chat stages involved for current textual conversations in progress. For example, the chat stage row 306 is exemplarily depicted to display chat stages 1 to N in row cells 334, 336, 338 and 340. As explained above, the chat stages may include stages, such as a 'greeting stage', an 'authentication stage', a 'problem identification stage', a problem closure stage' and the like. Additionally, the chat stage row 306 is depicted to display a row cell 342 labelled 'Overall Mood', which serves as a column heading for cells configured to capture overall mood associated with the textual conversations between the agents and the customers. The agent chats column 304 and the chat stage row 306 configure an Y-axis and an X-axis, respectively, based upon which moods tracked corresponding to various chat stages for the textual conversations associated with various agents may be plotted as depicted in the mood display section 308. In the mood display section 308, the visual representation of the one or more mood metrics comprises representation of textual labels, for example, a neutral sentiment, a positive sentiment and a negative sentiment. For example, entries 344 and 346 display textual labels for tracked moods, for example, 'Neutral' and 'Negative' for chat stages 2 and 7 (corresponding to rows 336 and 338), respectively corresponding to the textual conversation associated with Agent_Name1. Further, the overall mood corresponding to the row cell 342 for the current textual conversation involving Agent_Name1 is depicted to be captured as a 'Negative' mood as depicted in entry 348.

As explained above, the mood tracking module 210 utilizes polarity-based approaches (for example, algorithms based on lexicon-based sentiment analysis and 'subjectivity based approaches') and algorithms based on 'supervised text classification approaches' stored in the storage module 204 to track mood changes. As described with reference to FIG. 2, for the polarity-based approaches, for each chat stage, sentences, n-grams, part-of-speech tags, or words or any combination of these are assigned polarity strength scores, and an overall mood level/score (also interchangeably referred to as 'mood' or 'overall mood') is calculated for each chat stage. It is also to be noted that in some embodiments, some types of part-of-speech may be assigned with higher scores as compared to other types, for example, adjectives are given more weight in the calculation of the mood metrics as compared to Nouns or Pronouns. Further, in addition to the core sentiment scoring algorithms (for example, the algorithms based on the lexicon-based sentiment analysis, the 'subjectivity based approaches' and the 'supervised text classification approaches'), additional algorithms such as entity recognition algorithms, similarity scoring algorithms and various classifiers may be utilized to determine the overall mood for each chat stage.

It is noted that the three mood levels, such as 'Positive', 'Negative' and 'Neutral are depicted in FIG. 3 for illustration purposes only and it is understood that the meaning of the term 'mood', 'mood level' and 'overall mood' as used herein is not restricted to imply to only such sentiments but also includes metrics related to customer mood—like customer effort, customer engagement, customer satisfaction and the like. In an embodiment, a granularity of the mood levels may be increased with accuracy of the prediction models. Further, the prediction models explained with reference to FIG. 1 may be utilized to identify patterns in tracked moods and predict moods or changes therein for subsequent chat stages. Accordingly, a UI, such as the UI 300 enables a supervisor or quality assurance personnel to monitor the health of the entire population of textual conversations in real-time without having to read each textual conversation line-by-line.

As explained above, one or more column cells associated with agent names in the Agent Chats column 304 are associated with a drop-down option, upon selection of which a corresponding chat ID is displayed to the supervisor. Upon selection of a chat ID, a drill-down view of the corresponding textual conversation is displayed to the supervisor. An example UI corresponding to the drill-down view of the textual conversation is depicted in FIG. 4.

Figure 4:
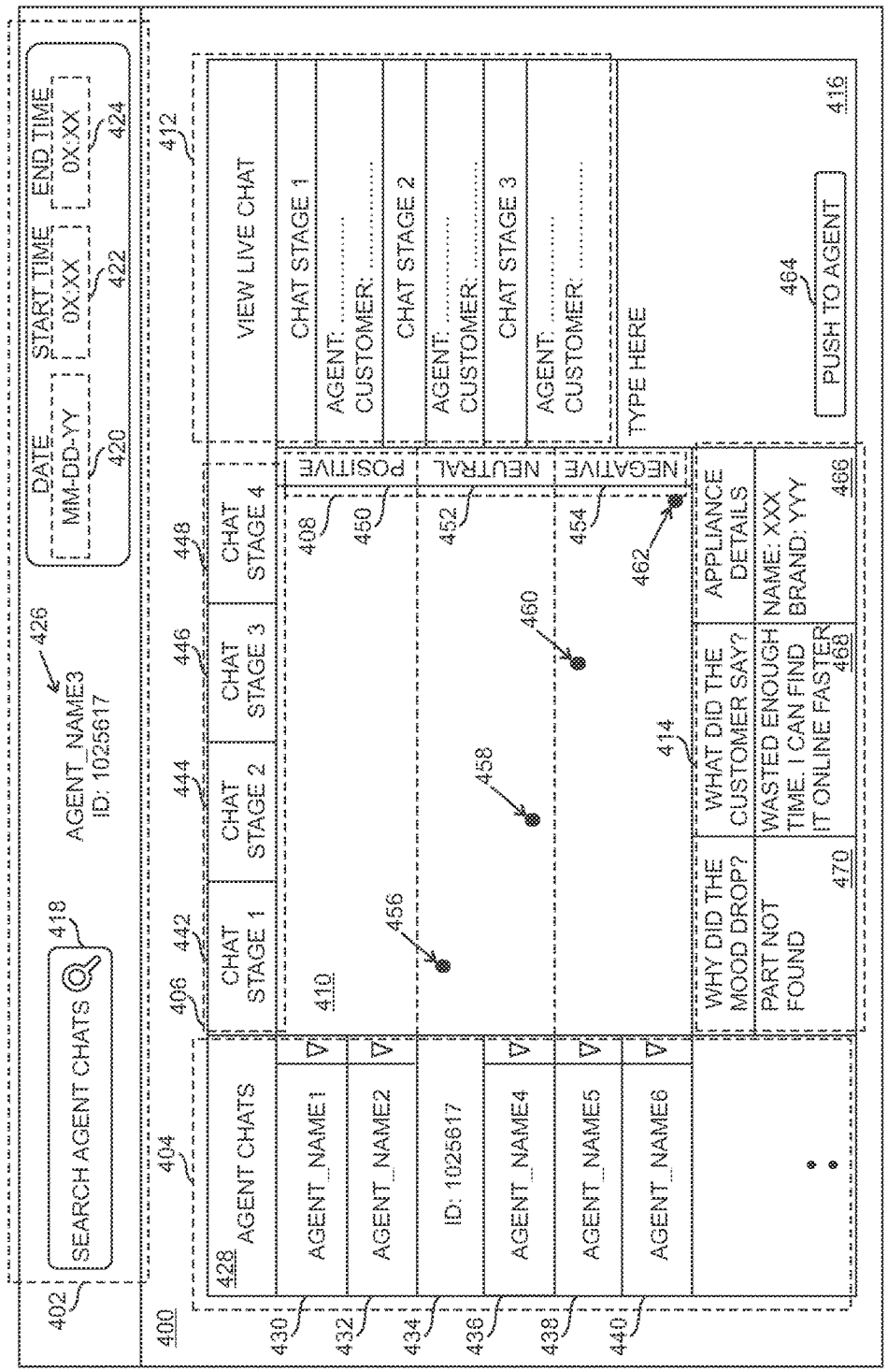
FIG. 4 illustrates a second example user interface corresponding to a supervisor chat console in accordance with an embodiment of the invention.

Referring now to FIG. 4, a second example UI 400 corresponding to a supervisor chat console is illustrated in accordance with an embodiment of the invention. As explained above, the supervisor may select a chat ID associated with any agent name to examine in detail the textual conversation associated with that particular agent. More specifically, the UI 400 presents the supervisor with a view in which he/she can examine a selected textual conversation in detail and, in some embodiments, drill down into the possible reasons for a mood drop in customer mood, for example from a neutral mood to a negative mood. Accordingly, in some embodiments, the UI 400 is also referred to as a 'Drill-Down view'. The UI 400 is depicted to include a UI information panel 402, an agent chats column 404, a chat stage row 406, a mood level column 408, a mood change display section 410, a textual conversation display section 412, a mood analysis section 414 and a recommendation section 416.

The UI information panel 402 is depicted to display a search dialog box 418, a current date 420 in addition to a start time 422 and an end time 424 of time interval. The search dialog box 418, the current date 420, the start time 422 and the end time 424 of the time interval are similar to search dialog box 318, the current date 312, the start time 314 and the end time 316 of the time interval explained with reference to UI 300 in FIG. 3 and are not explained herein for sake of brevity. The UI information panel 402 is further depicted to display an agent name and an ID associated with the agent whose textual conversation is being accessed. For example, the UI information panel 402 is exemplarily depicted to display agent name as 'Agent_Name3' 426 along with ID as '1025617'. The agent chats column 404 displays a list of all agents currently chatting in the selected time interval. More specifically, the agent chats column 404 depicts a column heading 'Agent Chats' 428 followed by a listing of agent names as exemplarily depicted in column cells 430, 432, 434, 436, 438 and 440.

The listing in the agent chats column 404 is similar to the listing in the agent chats column 304 as explained with reference to the UI 300 in FIG. 3. More specifically, each column cell including the agent name is associated with a drop-down option for accessing the chat ID corresponding to the on-going textual conversation involving the corresponding agent. In an embodiment, the column cell corresponding to the agent whose textual conversation is being viewed in the 'Drill-Down view' is configured to display only the agent ID, as depicted in column cell 434. In an embodiment, the selection of the column heading 'Agent Chats' 428 may enable the supervisor to navigate to the 'Snapshot view', such as the 'Snapshot View' explained with reference to FIG. 3.

The chat stage row 406 displays a list of chat stages involved for current textual conversations in progress. For example, the chat stage row 406 is exemplarily depicted to display chat stages 1 to 4 in row cells 442, 444, 446 and 448. As explained above, the chat stages may correspond to stages, such as a 'greeting stage', an 'authentication stage', a 'problem identification stage', a problem closure stage' and the like. The mood level column 408 is depicted to include three column cells 450, 452 and 454 corresponding to 'Positive', 'Neutral' and 'Negative' mood. It is noted that the three mood levels in the mood level column 408 are depicted herein for illustration purposes only. It is understood that the granularity of such levels may be increased or decreased appropriately. For example, if "mood" being tracked corresponds to customer effort, then the levels may be chosen to be "High" and "Low" mood levels. Similarly, if "mood" being tracked corresponds to customer engagement, then the levels may be chosen to be "Highly Engaged", "Moderately Engaged", "Neutral", "Moderately Disengaged", and "Highly Disengaged" mood levels.

The mood level column 408 and the chat stage row 406 configure a Y-axis and an X-axis, respectively, along which moods tracked corresponding to various chat stages for textual conversations may be plotted as depicted in the mood change display section 410. For example, circle entries 456 and 458 suggest a 'Neutral' mood level for chat stages 1 and 2, whereas the circle entries 460 and 462 suggest a 'Negative' mood level for chat stages 3 and 4 for the textual conversation associated with 'Agent_Name3'. The co-ordinates and the size of circle entries 456, 458, 460 and 462 (hereinafter collectively referred as circle entries 456-462) may also be configured to provide an indication of response times associated with each textual conversation stage. For example, a size of the circle corresponding to the circle entries 456-462 may represent the total time spent in that chat stage, or the average response time of the agent in that chat stage, or the average response time of the customer in that chat stage and the like. This enables the supervisor to see how mood has changed across the different chat stages in the textual conversation, and determine a suitable intervention.

The textual conversation display section 412 is configured to display the entire chat text annotated with stage and mood information. The chat text typed by the agent and the customer is displayed next to the agent's name and the customer's name, respectively, as exemplarily illustrated in the textual conversation display section 412. It is understood that the agent's name and the customer's name are depicted as "Agent" and "Customer" for illustration purposes only. Further, the agent and customer lines for a particular chat stage may be displayed in a box labelled with the chat stage name on top. In an example representation, the one or more mood metrics for chat stages may be represented in color coded representations. For instance, the agent and customer lines in the textual conversation display section 412 may be colored to indicate the mood level for that stage (for example, a green color for positive mood, a yellow color for neutral mood and a red color for negative mood).

The recommendation section 416 placed below the textual conversation display section 412 provides the supervisor with a message window to type a message to the agent (such as the Agent_Name3) associated with the textual conversation. In an embodiment, the recommendation section 416 may be associated with a recommendation widget (not shown in FIG. 4) configured to display information or recommendation to the supervisor, which may include text and/or rich content in the form of diagrams, images, tables, hyperlinks, info graphics and the like. The supervisor may copy the entire recommendation content or parts thereof and paste it into the message window with a single click from the recommendation widget. The recommendation section 416 further includes a "Push to Agent" button 464 to send the message in real-time to the agent. This enables the supervisor to intervene in real-time to coach the agent and guide the textual conversation towards its target outcome.

The mood analysis section 414 may be configured to include a set of configurable widgets that provide additional useful information to the supervisor. The widgets shown in UI 400 include a widget 466 that displays the name and brand of the appliance being discussed in the textual conversation; a widget 470 that predicts the probable reasons for the mood drop (such as 'Part not found'); and a widget 468 that displays the customer response with negative mood (exemplarily depicted to include the text of customer response as 'Wasted enough time. I can find it online faster'). The widgets listed above are illustrative, and pertain to the scenario where the customer is trying to locate and order the correct replacement part for an appliance from an online retailer.

More examples of useful widgets (driven by text mining of textual conversation, and mining of other metadata pertaining to that interaction prior to the textual conversation, along with customer profile information & CRM data) may include, but are not limited to (1) a widget that ranks textual conversations by the severity of the predicted issue (based on customer's lifetime value, number of previous attempts to resolve the problem, and so on) when multiple textual conversations show mood drops simultaneously requiring the supervisor to select the most critical ones for intervention quickly; (2) a widget that classifies a chat with mood drop or any other anomalous mood change or pattern as—"need to intervene" or "no need to intervene", which may be useful to a supervisor who has to monitor hundreds of textual conversations simultaneously in real-time; (3) a widget that predicts abrupt termination of a textual conversation by customer and/or fall in customer engagement; (4) a widget that alerts the supervisor to abnormally high response time for an agent or a customer; (5) a widget that alerts the supervisor to recurring patterns of mood drop for a given agent, or for a given product, or for a given type of customer problem; (6) a widget that detects trigger patterns and alerts the supervisor to a likely potential mood drop, allowing the supervisor to intervene with a message to the agent and prevent the drop from happening; (7) a widget that recommends interventions based on the predicted reason for the mood drop, and the success rate for various interventions for that category of mood drops and (8) a "Find Similar Chat" widget that identifies and displays to the supervisor textual conversations similar to the currently selected textual conversation. "Similarity" here may refer to similarity in pattern of mood change across chat stages of a textual conversation, similarity in pattern of chat stages in a textual conversation, similarity in interventions recommended, similarity in response time patterns, similarity in agent response patterns, similarity in customer response patterns, and so on. The widget also allows filtering of similar textual conversations found by various criteria such as agent name or agent ID, start date-time or end date-time of textual conversation, etc.

In some embodiments, the supervisor chat console may also include a feedback widget with appropriate buttons for each UI section that allows the supervisor to rate the accuracy of the UI contents. The feedback widget may also contain a free-text comment box for supervisor suggestions and comments. The purpose of the feedback widget may serve to enable the mood and stage analysis models (and recommendation engine by implication) to learn actively in real-time. The feedback widget may also be displayed selectively in those cases where such models have poor predictive power or low accuracy. In an embodiment, the supervisor chat console may also include a mechanism for agents to message the supervisor in real-time asking for help in resolving a particular problem during a textual conversation. In such cases, the supervisor may use the information displayed in the 'Drill-down view' to determine the best intervention strategy. A method configured to drive a textual conversation towards its target outcome by predicting and tracking mood changes is explained with reference to FIG. 5.

Figure 5:
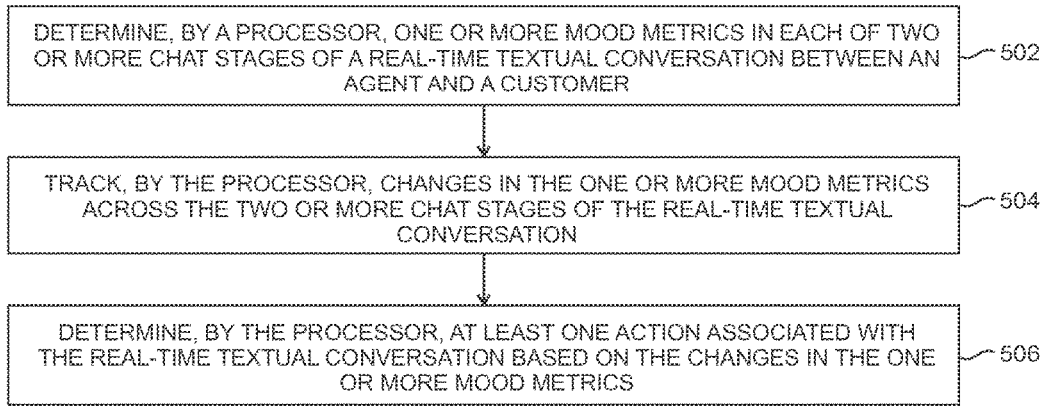
FIG. 5 illustrates a flow diagram of a first example method for improving goal-directed textual conversations between agents and customers in accordance with an embodiment of the invention.

FIG. 5 illustrates a flow diagram of a first example method 500 for improving goal-directed textual conversations between agents and customers in accordance with an embodiment of the invention. The method 500 is configured to drive a textual conversation towards its target outcome by predicting and tracking mood changes in the textual conversation, or performing other actions associated with the textual conversation. In an embodiment, the method 500 may be performed by the apparatus 200 of FIG. 2.

At 502 of the method 500, one or more mood metrics are determined in each of two or more chat stages of a real-time textual conversation between an agent and a customer. The one or more mood metrics are determined by a processor, for example the mood tracking module 210 of the processor 202.

In an embodiment, the two or more chat stages may be predicted from among a plurality of chat stages associated with the real-time textual conversation for determining the one or more mood metrics in each of the two or more chat stages. In an example, the two or more chat stages may be predicted by the stage prediction module 212 of the apparatus 200. The two or more chat stages may be predicted based on, for example, historical data samples and/or statistical analysis of previous textual conversations. For example, in a real-time textual conversation where the customer is trying to locate and order a correct replacement part for an appliance from an online retailer, relevant chat stages of the real-time textual conversation might be "ask model number", "provide model number", "confirm model number", "order confirmation", "shipping query", and the like. Herein, the two or more chat stages may be sequential chat stages, and even the two or more chat stages can be only two sequential chat stages or all of the plurality of chat stages associated with the textual conversation. In some implementations, the two or more chat stages may not be sequential chat stages as well, for example, one or more chat stages of the plurality of chat stages may be skipped for calculating the mood metrics. As described with reference to FIG. 2, the text mining and machine learning algorithms can be used to predict the chat stages of the textual conversation.

Examples of such algorithms include, but are not limited to, classification algorithms based on Naïve Bayes or Logistic Regression, clustering algorithms like k-means or hierarchical clustering, decision trees, random forests, hidden Markov models, conditional random fields, and other algorithms based on probabilistic graphical models used for sequence mining and prediction, with flexibility for fusion of multiple model topologies and multiple voting schemes.

At 504, changes in the one or more mood metrics are tracked across the two or more chat stages of the real-time textual conversation. The changes in the one or more mood metrics are tracked by the processor, for example the mood tracking module 210 of the processor 202. In an embodiment, text mining and prediction models 152 listed with reference to FIG. 1 may be utilized for predicting and tracking the changes in the one or more mood metrics across the two or more chat stages of the real-time textual conversation. In an embodiment, the plurality of chat stages is defined based on at least one of contiguous set of responses between the agent and the customer in the real-time textual conversation.

The prediction and tracking of the two or more chat stages and the changes in the one or more mood metrics determined in each chat stage is performed as illustrated with reference to UIs 300 and 400 of the supervisor chat console with reference to FIGS. 3 and 4, respectively. In an embodiment, the prediction and tracking of the chat stages and the changes in the one or more mood metrics may assist in identifying mood drop and/or other undesirable mood change patterns.

In an embodiment, algorithms for predicting and tracking the changes in the one or more mood metrics of either agent or customer may include, but are not limited to algorithms based on polarity-based approaches (algorithms based on lexicon-based sentiment analysis and/or algorithms based on subjectivity-based approaches), or algorithms based on 'supervised text classification approaches'. Examples of the algorithms based on the lexicon-based sentiment analysis, the 'subjectivity based approaches' and the 'supervised text classification approaches' are described with reference to FIG. 2. The above described algorithms, with flexibility for fusion of multiple model topologies and multiple voting schemes, may also be used in conjunction with one or more algorithms/approaches for example, entity recognition algorithms, similarity scoring algorithms and various classifiers.

At 506, at least one action associated with the real-time textual conversation is determined based on the changes in the one or more mood metrics. In an embodiment, the apparatus 200 may determine the at least one action associated with the real-time textual conversation based on the reasons for the mood drop or mood change patterns that are determined. In another embodiment, the apparatus 200 may determine the at least one action associated with the real-time textual conversation that is annotated with above data (for example, reasons for changes in the mood) and which is displayed (for example, by the UI module 206) to a supervisor. Some examples of the at least one action are further described with references to FIGS. 6 to 8. The at least one action may relate to driving the textual conversation to a target outcome, or for monitoring the textual conversation for quality improvement purposes. For instance, in an example, the at least one action provides information related to the recommendations for the agent to the supervisor so that the supervisor can intervene in the real-time textual conversation via message to the agent. Further, such actions may be recommended to one or more agents/supervisors in real-time to drive real-time textual conversations towards the target outcome.

In FIG. 5, the textual conversation between a single agent and a single customer that is monitored by a supervisor, is described. However, it should be understood that the same operations of the FIG. 5 can be replicated/applied for monitoring the multiple textual conversations between multiple agents and multiple customers. For instance, a supervisor, through his/her electronic device in which the operations of the method 500 can be performed, can determine one or more mood metrics in chat stages of multiple textual conversations, determine changes in the one or more metrics across chat stages of the multiple textual conversations, and also determine at least one action for the agents engaged in the multiple textual conversations in a distinct manner.

Figure 6:
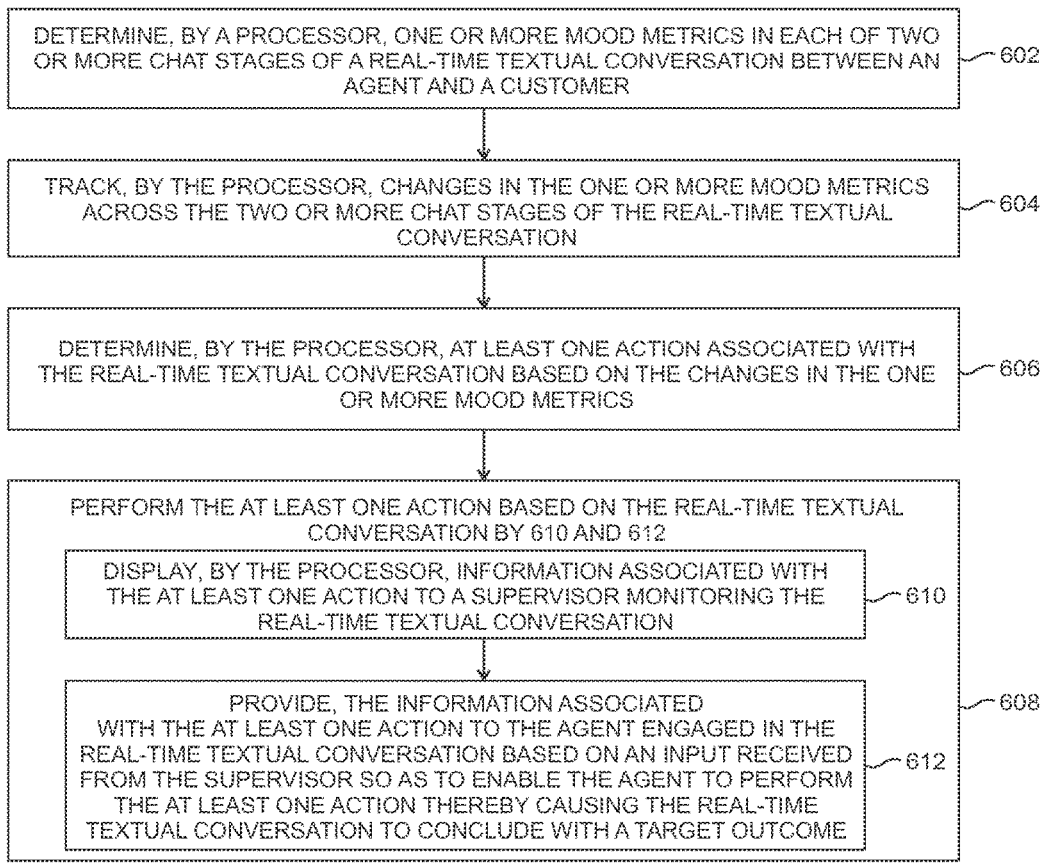
FIG. 6 illustrates a flow diagram of a second example method for improving goal-directed textual conversations between agents and customers in accordance with an embodiment of the invention.

FIG. 6 illustrates a flow diagram of a second example method 600 for improving goal-directed textual conversations between agents and customers in accordance with an embodiment of the invention. The method 600 is configured to drive a textual conversation towards its target outcome by predicting and tracking mood changes in the textual conversation. In an embodiment, the method 600 may be performed by the apparatus 200 of FIG. 2. Though, FIG. 6 is described with reference to a single textual conversation between a single agent and a single customer as monitored by a supervisor, however, it should be understood that the same operations of the FIG. 6 can be replicated/applied for monitoring the multiple textual conversations between multiple agents and multiple customers.

At 602 of the method 600, one or more mood metrics are determined in each of two or more chat stages of a real-time textual conversation between an agent and a customer. An example of an operation performed at 602 is the operation performed at 502 as described with reference to FIG. 5. At 604, changes in the one or more mood metrics are tracked across the two or more chat stages of the real-time textual conversation. The changes in the one or more mood metrics are tracked by the processor, for example the mood tracking module 210 of the processor 202. An example of an operation performed at 604 is the operation performed at 504 as described with reference to FIG. 5. At 606, at least one action associated with the real-time textual conversation is determined based on the changes in the one or more mood metrics. An example of an operation performed at 606 is the operation performed at 506 as described with reference to FIG. 5.

At 608, the at least one action is performed by operations performed at blocks 610 and 612. At 610, the information associated with the at least one action is displayed to a supervisor monitoring the real-time textual conversation. In an example, the information associated with the at least one action is displayed by the processor 202. For instance, the supervisor may receive such information associated with the at least one action on the UI module 206 of the apparatus 200, and the supervisor may accordingly decide whether to provide such information to the agent. At 612, the information associated with the at least one action is provided to the agent engaged in the real-time textual conversation. In an embodiment, the information may be provided to the agent, by the apparatus 200, based on an input received from the supervisor. For example, the supervisor may provide input for pushing the information associated with the at least one action to the agent. As the agent receives the information associated with the at least one action (for example, a recommendation/suggestion to use a particular statement in the conversation, suggest a product to the customer, and the like), it enables the agent to perform the at least one action thereby causing the real-time textual conversation to conclude with a target outcome. In such a manner, the supervisor through the apparatus 200 may intervene in the real-time textual conversation via message to the agent in order to cause the real-time textual conversation to conclude with the target outcome.

Figure 7:
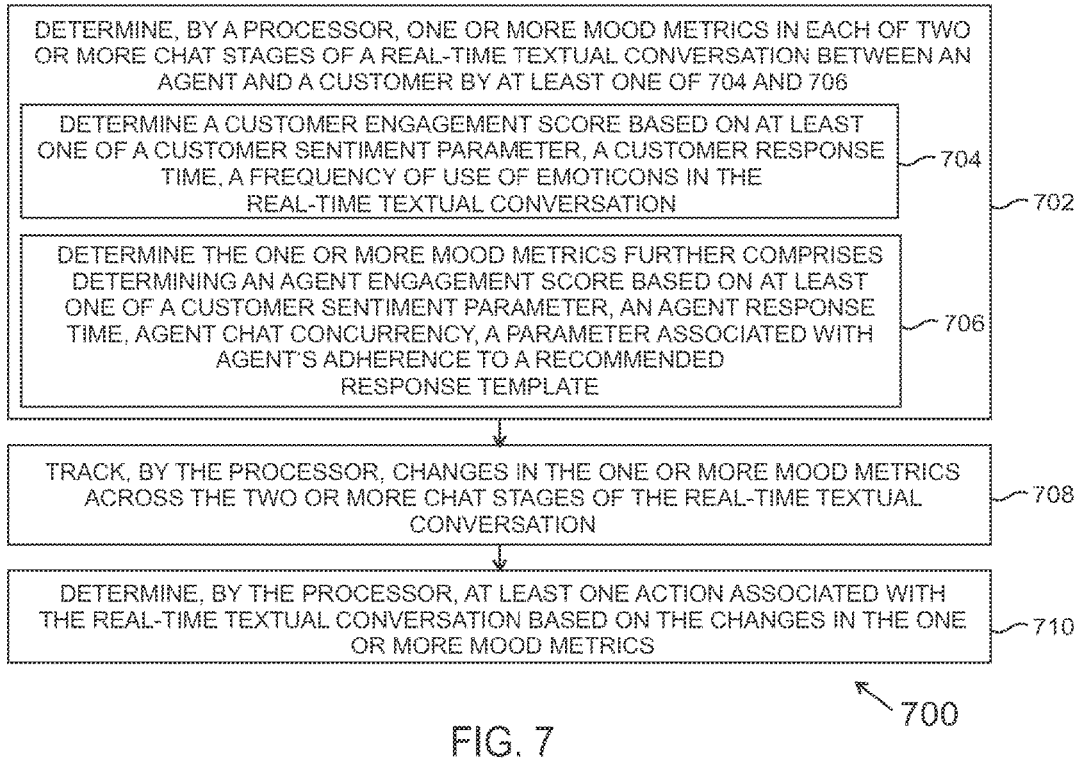
FIG. 7 illustrates a flow diagram of a third example method for improving goal-directed textual conversations between agents and customers in accordance with an embodiment of the invention.

FIG. 7 illustrates a flow diagram of a third example method 700 for improving goal-directed textual conversations between agents and customers in accordance with an embodiment of the invention. The method 700 is configured to drive a textual conversation towards its target outcome by predicting and tracking mood changes in the textual conversation. In an embodiment, the method 700 may be performed by the apparatus 200 of FIG. 2. Though, FIG. 7 is described with reference to a single textual conversation between a single agent and a single customer as monitored by a supervisor, however, it should be understood that the same operations of the FIG. 7 can be replicated/applied for monitoring the multiple textual conversations between multiple agents and multiple customers.

At 702 of the method 700, one or more mood metrics are determined in each of two or more chat stages of a real-time textual conversation between an agent and a customer. The one or more mood metrics are determined by a processor, for example the mood tracking module 210 of the processor 202. In an embodiment, the two or more chat stages may be predicted from among a plurality of chat stages associated with the real-time textual conversation for determining the one or more mood metrics in each of the two or more chat stages. In an embodiment, the one or more mood metrics may be determined by at least one of operations performed at blocks 704 and 706. It should be noted that the one or more mood metrics may be determined by operations other than the operations performed at blocks 704 and 706, for example by determining a customer satisfaction, and such operations should not be limited to the operations performed at blocks 704 and 706.

At 704, a customer engagement score is determined based on at least one of a customer sentiment parameter, a customer response time, and a frequency of use of emoticons in the textual conversation. At 706, an agent engagement score is determined based on at least one of an agent response time, agent chat concurrency, and a parameter associated with agent's adherence to a recommended response template.

At 708, changes in the one or more mood metrics are tracked across the two or more chat stages of the real-time textual conversation. The changes in the one or more mood metrics are tracked by the processor, for example the mood tracking module 210 of the processor 202. An example of an operation performed at 708 is the operation performed at 504 as described with reference to FIG. 5. At 710, at least one action associated with the real-time textual conversation is determined based on the changes in the one or more mood metrics. An example of an operation performed at 710 is the operation performed at 506 as described with reference to FIG. 5.

Figure 8:
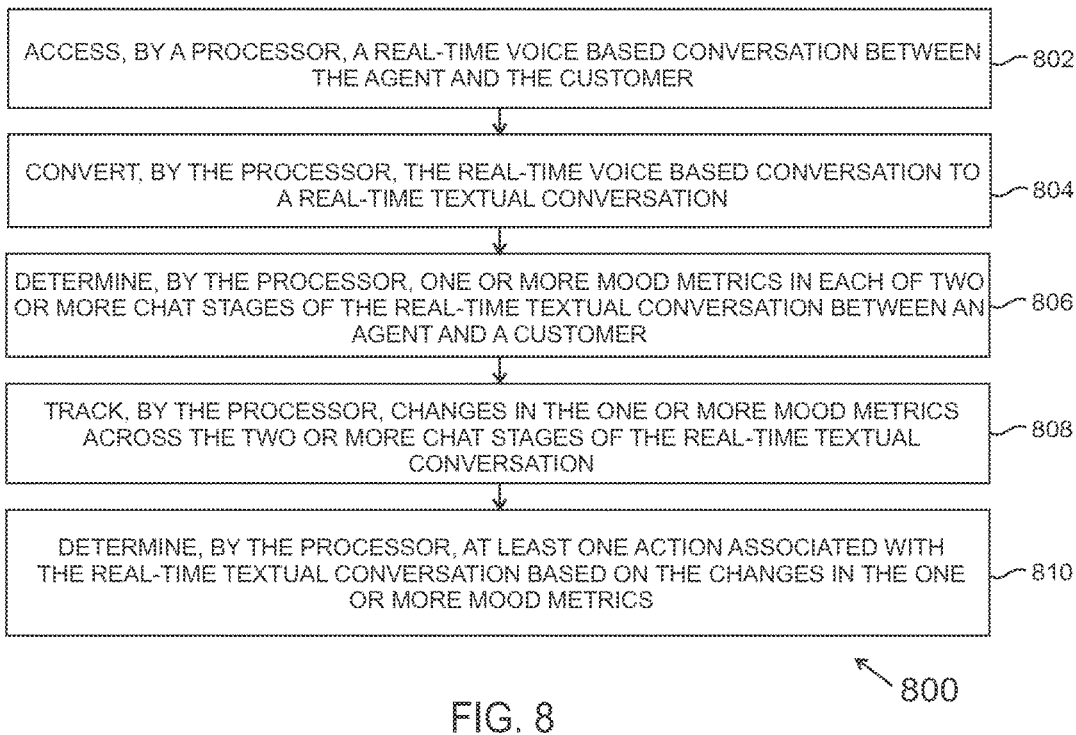
FIG. 8 illustrates a flow diagram of a fourth example method for improving goal-directed textual conversations between agents and customers in accordance with an embodiment of the invention.

FIG. 8 illustrates a flow diagram of a fourth example method 800 for improving goal-directed textual conversations between agents and customers in accordance with an embodiment of the invention. The method 800 is configured to drive a textual conversation towards its target outcome by predicting and tracking mood changes in the textual conversation. In an embodiment, the method 800 may be performed by the apparatus 200 of FIG. 2. Although, FIG. 8 is described with reference to a single textual conversation between a single agent and a single customer as monitored by a supervisor, however, it should be understood that the same operations of the FIG. 8 can be replicated/applied for monitoring the multiple textual conversations between multiple agents and multiple customers.

At 802 of the method 800, a real-time voice conversation between an agent and a customer is accessed. For example, the apparatus 200 or a supervisor of the agent is able to access the real-time voice conversation between the agent and the customer. At 804 of the method 800, the real-time voice based conversation is converted to the real-time textual conversation.

At 806 of the method 800, one or more mood metrics are determined in each of two or more chat stages of the real-time textual conversation between the agent and the customer. An example of an operation performed at 806 is the operation performed at 502 as described with reference to FIG. 5. At 808, changes in the one or more mood metrics are tracked across the two or more chat stages of the real-time textual conversation. The changes in the one or more mood metrics are tracked by the processor, for example the mood tracking module 210 of the processor 202. An example of an operation performed at 808 is the operation performed at 504 as described with reference to FIG. 5. At 810, at least one action associated with the real-time textual conversation is determined based on the changes in the one or more mood metrics. An example of an operation performed at 810 is the operation performed at 506 as described with reference to FIG. 5.

Figure 9:
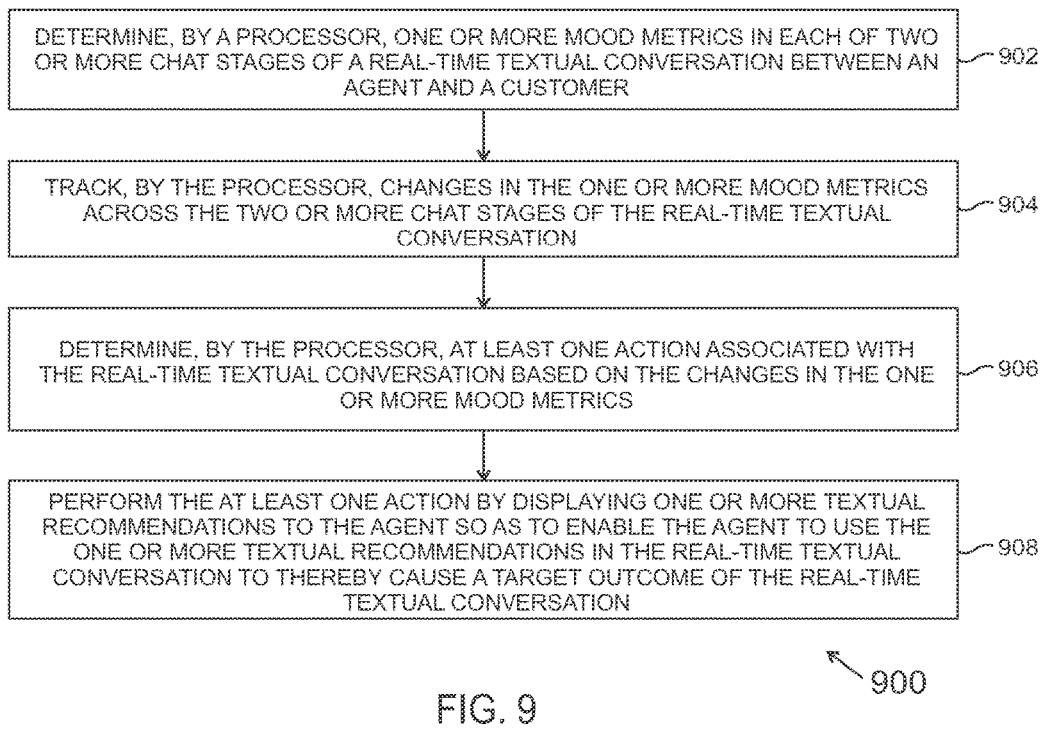
FIG. 9 illustrates a flow diagram of a fifth example method for improving goal-directed textual conversations between agents and customers in accordance with an embodiment of the invention.

FIG. 9 illustrates a flow diagram of a fifth example method 900 for improving goal-directed textual conversations between agents and customers in accordance with an embodiment of the invention. The method 900 is configured to drive a textual conversation towards its target outcome by predicting and tracking mood changes in the textual conversation. In an embodiment, the method 900 may be performed by the apparatus 200 of FIG. 2. An example of the apparatus 200 performing the method 900 can be embodied in the electronic device associated with the agent, for example, any of the devices 122-128 described with reference to FIG. 1. Although, FIG. 9 is described with reference to a single textual conversation between an agent and a single customer, however, it should be understood that the same operations of the FIG. 9 can be replicated/applied for monitoring the multiple textual conversations between the agent and multiple customers.

At 902 of the method 900, one or more mood metrics are determined in each of two or more chat stages of a real-time textual conversation between an agent and a customer. An example of an operation performed at 902 is the operation performed at 502 as described with reference to FIG. 5. At 904, changes in the one or more mood metrics are tracked across the two or more chat stages of the real-time textual conversation. The changes in the one or more mood metrics are tracked by the processor, for example the mood tracking module 210 of the processor 202. An example of an operation performed at 904 is the operation performed at 504 as described with reference to FIG. 5. At 906, at least one action associated with the real-time textual conversation is determined based on the changes in the one or more mood metrics. An example of an operation performed at 906 is the operation performed at 506 as described with reference to FIG. 5.

At 908, the at least one action is performed by displaying one or more textual recommendations to the agent so as to enable the agent to use the one or more textual recommendations in the real-time textual conversation to thereby cause a target outcome of the real-time textual conversation. In this embodiment, the apparatus 200 is embodied in the electronic devices (for example, 122-128) associated with the agents (for example, 104-110) and the supervisor (for example, supervisors 112 and 114) may not be necessarily present. For example, in this embodiment, the apparatus 200 embodied in the electronic devices of the agent is configured to determine and track the one or more mood metrics associated with the textual conversation and provide recommendations to the agents to drive the textual conversation to the target outcome.

Various embodiments disclosed herein provide numerous advantages. The systems and methods disclosed herein enable predicting and tracking of mood changes in on-going goal-directed textual conversations, such as an online chat conversations between customer service representatives and customers. Such prediction and tracking of mood changes is used in real-time to fulfil the customer's intent more effectively and drive the conversation towards the target outcome. Further, the techniques disclosed herein enable monitoring an agent's actions for quality control purposes with reduced manual intervention. Further, real-time tracking of changes in moods enables recommending next best actions to the agent/supervisor, and/or alert a supervisor to potential deviations from desired standards of quality or from target outcome pathways. Further, an analysis of mood change patterns in historical data from many such interactions may also be used to train machine learning algorithms to recognize ideal interaction scenarios that maximize customer satisfaction and optimize the use of customer care resources.

Machine learning algorithms can also be trained from such signals to predict deleterious changes or trends in customer mood, and recommend corrective actions in real-time to prevent mood from deteriorating any further. Further, the apparatus 200 described above may be adapted to automate the workflow of supervisors or quality assurance personnel by automatically detecting and/or predicting in advance mood change anomalies or undesirable mood change patterns, and suggesting corrective actions to agents in real-time. In some embodiments, the apparatus 200 may also be adapted, with suitable modifications, to function in voice-call customer care interactions. For example, a speech recognition engine (for example an automatic speech recognition engine along with statistical language modes in addition to domain-specific grammar data) may be employed to convert the voice signal into text, which may then be provided as input to the apparatus 200. The resultant transcript can be mined for mood and stage related information in the manner described earlier.

Although the present invention has been described with reference to specific example embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 200, the processor 202 and the memory 204 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor or computer to perform one or more operations (for example, operations explained herein with reference to FIGS. 5 to 9). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the present invention, as discussed above, may be practiced with steps and/or operations in a different order, and/or with hardware elements in configurations which are different than those which are disclosed. Therefore, although the invention has been described based upon these example embodiments, it is noted that certain modifications, variations, and alternative constructions may be apparent and well within the spirit and scope of the invention. Although various example embodiments of the present invention are described herein in a language specific to structural features and/or methodological acts, the subject matter defined in the appended claims is not necessarily limited to the specific features or acts described above. Rather, the specific features and acts described above are disclosed as example forms of implementing the claims.

The invention claimed is:

1. A computer-implemented method, comprising:
   determining, by a processor, one or more mood metrics in each of two or more chat stages of a real-time textual conversation between an agent and a customer, wherein said determining the one or more mood metrics for a chat stage of the real-time textual conversation, by the processor, further comprises determining an overall mood for the chat stage based on a polarity based approach by:
      assigning polarity labels to features present in the chat stage;
      assigning polarity strength scores for the polarity labels assigned to the features present in the chat stage;
      calculating weighted polarity scores for the features based on aggregation of the polarity labels and the polarity strength scores to determine the overall mood for the chat stage; and
      determining the overall mood, by the processor, based on a subjectivity-based approach by removing terms classified as objective from the real-time textual conversation prior to assigning the polarity labels and the polarity strength scores;
   tracking, by the processor, changes in the one or more mood metrics across the two or more chat stages of the real-time textual conversation between the agent and the customer; and
   determining, by the processor, at least one action associated with the real-time textual conversation based on the changes in the one or more mood metrics;
   performing, by the processor, the at least one action associated with the real-time textual conversation, wherein performing the at least one action comprises any of:
      displaying, by the processor, information associated with the at least one action to a supervisor monitoring the real-time textual conversation and providing, by the processor, the information associated with the at least one action to the agent engaged in the real-time textual conversation based on an input received from the supervisor so as to enable the agent to perform the at least one action thereby causing a target outcome of the real-time textual conversation;
      monitoring an agent engagement score associated with the two or more chat stages of the real-time textual conversation;
      storing the real-time textual conversation with a timestamp of the real-time textual conversation; and
      displaying one or more textual recommendations to the agent so as to enable the agent to use the one or more textual recommendations in the real-time textual conversation to thereby cause a target outcome of the real-time textual conversation.

2. The method of claim 1, further comprising:
   predicting, by the processor, the two or more chat stages from among a plurality of chat stages associated with the real-time textual conversation for determining the one or more mood metrics in each of the two or more chat stages.

3. The method of claim 1, further comprising:
   displaying in a user interface a visual representation of the one or more mood metrics determined in each of the two or more chat stages for tracking the changes in the one or mood metrics.

4. The method of claim 3, wherein the visual representation of the one or mood metrics comprises representation of textual labels, the textual labels comprising a neutral sentiment, a positive sentiment and a negative sentiment.

5. The method of claim 3, wherein the visual representation of the one or mood metrics comprises one or more color coded representations in each of the two or more chat stages.

6. The method of claim 1, wherein said determining the one or more mood metrics comprises determining a customer engagement score based on at least one of a customer sentiment parameter, a customer response time, and a frequency of use of emoticons in the real-time textual conversation.

7. The method of claim 1, wherein said determining the one or more mood metrics comprises determining an agent engagement score based on at least one of an agent response time, an agent chat concurrency, and a parameter associated with agent's adherence to a recommended response template.

8. The method of claim 1, wherein determination of the at least one action is performed further based on historical information associated with one or more completed textual conversations.

9. The method of claim 1, wherein determination of the at least one action is performed further based on a statistical analysis of one or more completed textual conversations.

10. The method of claim 1, further comprising:
accessing, by the processor, a real-time voice based conversation between the agent and the customer; and
converting, by the processor, the real-time voice based conversation to the real-time textual conversation.

11. The method of claim 1, wherein said determining the one or more mood metrics for a chat stage further comprises determining an overall mood for the chat stage based on a supervised text classification approach.

12. An apparatus, comprising:
at least one processor; and
a storage module having stored therein machine executable instructions, that when executed by the at least one processor, cause the apparatus to:
determine one or more mood metrics in each of two or more chat stages of a real-time textual conversation between an agent and a customer, wherein said determining the one or more mood metrics for a chat stage of the real-time textual conversation, by the processor, further comprises determining an overall mood for the chat stage based on a polarity based approach by:
assigning polarity labels to features present in the chat stage;
assigning polarity strength scores for the polarity labels assigned to the features present in the chat stage;
calculating weighted polarity scores for the features based on aggregation of the polarity labels and the polarity strength scores to determine the overall mood for the chat stage; and
determining the overall mood based on a subjectivity-based approach by removing terms classified as objective from the real-time textual conversation prior to assigning the polarity labels and the polarity strength scores;
track changes in the one or more mood metrics across the two or more chat stages of the real-time textual conversation between the agent and the customer; and
determine at least one action associated with the real-time textual conversation based on the changes in the one or more mood metrics; and
an input-output (I/O) module; wherein the at least one processor is further configured to cause the apparatus to perform the at least one action by enabling the I/O module to any of:
displaying one or more textual recommendations to the agent so as to enable the agent to use the one or more textual recommendations in the real-time textual conversation to thereby cause a target outcome of the real-time textual conversation;
displaying information associated with the at least one action to a supervisor monitoring the real-time textual conversation and causing the I/O module to provide the information associated with the at least one action to the agent engaged in the real-time textual conversation based on an input received from the supervisor so as to enable the agent to perform the at least one action thereby causing a target outcome of the real-time textual conversation;
monitoring an agent engagement score associated with the two or more chat stages of the real-time textual conversation;
storing the real-time textual conversation with a timestamp of the real-time textual conversation; and
displaying one or more textual recommendations to the agent so as to enable the agent to use the one or more textual recommendations in the real-time textual conversation to thereby cause a target outcome of the real-time textual conversation.

13. The apparatus of claim 12, wherein the at least one processor comprises:
a stage prediction module configured to predict the two or more chat stages from among a plurality of chat stages associated with the real-time textual conversation for determining the one or more mood metrics in each of the two or more chat stages.

14. The apparatus of claim 12, wherein the apparatus is further configured to perform the at least one action associated with the real-time textual conversation.

15. The apparatus of claim 14, further comprising:
a user interface module; wherein the at least one processor is further configured to cause the user interface module to display a visual representation of the one or more mood metrics determined in each of the two or more chat stages for tracking the changes in the one or mood metrics.

16. The apparatus of claim 15, wherein the visual representation of the one or mood metrics comprises representation of textual labels, the textual labels comprising a neutral sentiment, a positive sentiment and a negative sentiment.

17. The apparatus of claim 15, wherein the visual representation of the one or mood metrics comprises one or more color coded representations in each of the two or more chat stages.

18. The apparatus of claim 12, wherein the at least one processor comprises a mood tracking module to determine the one or more mood metrics, and wherein the one or more mood metrics comprises a customer engagement score determined based on at least one of a customer sentiment parameter, a customer response time, and a frequency of use of emoticons in the real-time textual conversation.

19. The apparatus of claim 12, wherein the at least one processor comprises a mood tracking module to determine the one or more mood metrics, and wherein the one or more mood metrics comprises an agent engagement score determined based on at least one of an agent response time, an agent chat concurrency, and a parameter associated with agent's adherence to a recommended response template.

20. The apparatus of claim 12, wherein the apparatus is further configured to determine the at least one action based on historical information associated with one or more completed textual conversations.

21. The apparatus of claim 12, wherein the apparatus is further configured to determine the at least one action based on a statistical analysis of one or more completed textual conversations.

22. The apparatus of claim 12, wherein the apparatus is further configured to:
access a real-time voice based conversation between the agent and the customer; and
convert the real-time voice based conversation to the real-time textual conversation.

23. The apparatus of claim 12, wherein the apparatus is further configured to determine an overall mood for a chat stage of the real-time textual conversation based on a polarity-based approach by:
  assigning polarity labels to features present in the chat stage;
  assigning polarity strength scores for the polarity labels assigned to the features present in the chat stage; and
  calculating weighted polarity scores for the features based on aggregation of the polarity labels and the polarity strength scores to determine the overall mood for the chat stage.

24. The apparatus of claim 23, wherein the apparatus is further configured to determine the overall mood based on a subjectivity-based approach by removing terms classified as objective from the real-time textual conversation prior to assigning the polarity labels and the polarity strength scores.

25. The apparatus of claim 12, wherein the apparatus is further configured to determining an overall mood for a chat stage of the real-time textual conversation based on a supervised text classification approach.

26. A non-transitory computer-readable medium storing a set of instructions that when executed cause a computer to perform a method comprising:
  determining one or more mood metrics in each of two or more chat stages of a real-time textual conversation between an agent and a customer, wherein said determining the one or more mood metrics for a chat stage of the real-time textual conversation, by the processor, further comprises determining an overall mood for the chat stage based on a polarity based approach by:
    assigning polarity labels to features present in the chat stage;
    assigning polarity strength scores for the polarity labels assigned to the features present in the chat stage;
    calculating weighted polarity scores for the features based on aggregation of the polarity labels and the polarity strength scores to determine the overall mood for the chat stage; and
    determining the overall mood, by the processor, based on a subjectivity-based approach by removing terms classified as objective from the real-time textual conversation prior to assigning the polarity labels and the polarity strength scores;
  tracking changes in the one or more mood metrics across the two or more chat stages of the real-time textual conversation between the agent and the customer; and
  determining at least one action associated with the real-time textual conversation based on the changes in the one or more mood metrics; and
  performing, by the processor, the at least one action associated with the real-time textual conversation, wherein performing the at least one action comprises any of:
    displaying, by the processor, information associated with the at least one action to a supervisor monitoring the real-time textual conversation and providing, by the processor, the information associated with the at least one action to the agent engaged in the real-time textual conversation based on an input received from the supervisor so as to enable the agent to perform the at least one action thereby causing a target outcome of the real-time textual conversation;
    monitoring an agent engagement score associated with the two or more chat stages of the real-time textual conversation;
    storing the real-time textual conversation with a timestamp of the real-time textual conversation; and
    displaying one or more textual recommendations to the agent so as to enable the agent to use the one or more textual recommendations in the real-time textual conversation to thereby cause a target outcome of the real-time textual conversation.

27. The computer-readable medium of claim 26, wherein the method further comprises predicting the two or more chat stages from among a plurality of chat stages associated with the real-time textual conversation for determining the one or more mood metrics in each of the two or more chat stages.

28. The computer-readable medium of claim 27, wherein the method further comprises:
  displaying in a user interface a visual representation of the one or more mood metrics determined in each of the two or more chat stages for tracking the changes in the one or mood metrics.

29. The computer-readable medium of claim 28, wherein the visual representation of the one or mood metrics comprises representation of textual labels, the textual labels comprising a neutral sentiment, a positive sentiment and a negative sentiment.

30. The computer-readable medium of claim 28, wherein the visual representation of the one or mood metrics comprises one or more color coded representations in each of the two or more chat stages.

31. The computer-readable medium of claim 26, wherein the method further comprises performing the at least one action associated with the real-time textual conversation.

32. The computer-readable medium of claim 26, wherein said determining the one or more mood metrics comprises determining a customer engagement score based on at least one of a customer sentiment parameter, a customer response time, and a frequency of use of emoticons in the real-time textual conversation.

33. The computer-readable medium of claim 26, wherein said determining the one or more mood metrics comprises determining an agent engagement score based on at least one of an agent response time, an agent chat concurrency, and a parameter associated with agent's adherence to a recommended response template.

34. The computer-readable medium of claim 26, wherein determination of the at least one action is performed further based on historical information associated with one or more completed textual conversations.

35. The computer-readable medium of claim 26, wherein determination of the at least one action is performed further based on a statistical analysis of one or more completed textual conversations.

36. The computer-readable medium of claim 26, wherein the method further comprises:
  accessing a real-time voice based conversation between the agent and the customer; and
  converting the real-time voice based conversation to the real-time textual conversation.

37. The computer-readable medium of claim 26, wherein the method further comprises determining an overall mood for a chat stage of the real-time textual conversation based on a supervised text classification approach.

38. An apparatus comprising:
  at least one processor; and
  a storage module having stored therein machine executable instructions, that when executed by the at least one processor, cause the apparatus to supervise one or more real-time textual conversations between one or more agents and one or more customers, wherein for supervising a real-time textual conversation of the one or more real-time textual conversations, the apparatus is configured to:

determine one or more mood metrics in each of two or more chat stages of the real-time textual conversation between an agent and a customer associated with the real-time textual conversation, wherein said determining the one or more mood metrics for a chat stage of the real-time textual conversation, by the processor, further comprises determining an overall mood for the chat stage based on a polarity based approach by:

assigning polarity labels to features present in the chat stage;

assigning polarity strength scores for the polarity labels assigned to the features present in the chat stage;

calculating weighted polarity scores for the features based on aggregation of the polarity labels and the polarity strength scores to determine the overall mood for the chat stage; and determining the overall mood based on a subjectivity-based approach by removing terms classified as objective from the real-time textual conversation prior to assigning the polarity labels and the polarity strength scores;

track changes in the one or more mood metrics across the two or more chat stages of the real-time textual conversation between the agent and the customer; and determine at least one action associated with the real-time textual conversation based on the changes in the one or more mood metrics; and an input-output (I/O) module; wherein the at least one processor is further configured to cause the apparatus to perform the at least one action by enabling the I/O module to any of:

displaying one or more textual recommendations to the agent so as to enable the agent to use the one or more textual recommendations in the real-time textual conversation to thereby cause a target outcome of the real-time textual conversation:

displaying information associated with the at least one action to a supervisor monitoring the real-time textual conversation and causing the I/O module to provide the information associated with the at least one action to the agent engaged in the real-time textual conversation based on an input received from the supervisor so as to enable the agent to perform the at least one action thereby causing a target outcome of the real-time textual conversation;

monitoring an agent engagement score associated with the two or more chat stages of the real-time textual conversation;

storing the real-time textual conversation with a timestamp of the real-time textual conversation; and displaying one or more textual recommendations to the agent so as to enable the agent to use the one or more textual recommendations in the real-time textual conversation to thereby cause a target outcome of the real-time textual conversation.

39. The apparatus of claim 38, further comprising:

a user interface module; wherein the at least one processor is further configured to cause the user interface module to display a visual representation of mood metrics determined for chat stages of the one or more real-time textual conversations between one or more agents and one or more customers.

40. The apparatus of claim 39, wherein the visual representation of the one or mood metrics comprises representation of textual labels, the textual labels comprising a neutral sentiment, a positive sentiment and a negative sentiment, wherein the visual representation is configured to be displayed individually for each of the one or more real-time textual conversations.

* * * * *